United States Patent [19]

Soejima

[11] Patent Number: 4,466,025
[45] Date of Patent: Aug. 14, 1984

[54] FLOPPY DISC DEVICE WITH A DELAY MECHANISM

[75] Inventor: Toshiyuki Soejima, Atsugi, Japan
[73] Assignee: Ricoh Company, Ltd., Japan
[21] Appl. No.: 303,065
[22] Filed: Sep. 17, 1981

[30] Foreign Application Priority Data

Sep. 17, 1980 [JP] Japan .................................. 55-129873

[51] Int. Cl.³ .......................... G11B 15/12; G11B 5/02
[52] U.S. Cl. ........................................... 360/61; 360/57
[58] Field of Search ......................... 360/57, 60, 66, 61

[56] References Cited

U.S. PATENT DOCUMENTS

| | | | |
|---|---|---|---|
| 3,852,812 | 12/1974 | Reisfeld | 360/66 |
| 3,860,958 | 1/1975 | Hanson | 360/57 |
| 4,164,781 | 8/1979 | Brown | 360/66 |
| 4,300,174 | 11/1981 | Harman et al. | 360/66 |

*Primary Examiner*—Vincent P. Canney
*Attorney, Agent, or Firm*—Guy W. Shoup

[57] ABSTRACT

A floppy disc device having a read/write head, a pair of erase heads and a delay mechanism for delaying the operation of the erase heads with respect to the operation of the read/write head is provided. The pair of erase heads is provided in the downstream direction of the read/write head with respect to the movement of a floppy disc recording medium, thereby avoiding cross coupling between the read/write and erase heads. In accordance with one aspect of the present invention, the delay mechanism delays energization and deenergization of the erase heads with respect to those of the read/write head. Another aspect of the present invention is that the delay mechanism delays energization of the erase heads with respect to energization of the read/write head for some of a plurality of concentic recording tracks. The present invention made it possible to carry out proper tunnel-erasing without under-erasing and/or over-erasing.

4 Claims, 11 Drawing Figures

FLOPPY DISC DEVICE WITH A DELAY MECHANISM

BACKGROUND OF THE INVENTION

1. Field of the Invention

This invention relates generally to a floppy disc device and, more in particular, to a floppy disc device having a read/write head, a pair of erase heads spaced apart from the read/write head and a delay mechanism for delaying the drivement of the erase heads with respect to the drivement of the read/write head.

2. Description of the Prior Art

A floppy disc device is a contact type recording and reproducing device, in which use is made of a soft thin disc contained within a cover jacket for recording bits of information thereon. Such a floppy disc device is advantageous since random access may be carried out, thereby reducing access time.

In some of prior art floppy disc devices, use was made of a magnetic head assembly with a read/write head and a pair of erase heads arranged without a gap-to-gap distance therebetween. Here, the gap-to-gap distance is defined as a distance between a read/write gap of the read/write head and an erase gap of each of the erase heads in the direction of movement of a recording medium with respect to the head assembly. Such a magnetic head assembly having no gap-to-gap distance is difficult to manufacture and, therefore, expensive to make. Moreover, since the read/write head and the erase heads are all arranged on the same line, they must be operated at the same time, which, in turn, raises a problem of cross coupling between the read/write and erase heads.

In order to avoid such cross coupling, the erase heads may be located spaced apart from the read/write head in the downstream direction with respect to the movement of a recording medium, thereby defining a finite gap-to-gap distance between the read/write and erase gaps. However, in the case of a floppy disc device, a floppy disc usually has a particular recording format as shown in FIG. 1. For example, positions of recording tracks on the surface of a floppy disc are previously determined. Typically, a floppy disc has 77 circular recording tracks, all different in diameter and arranged concentrically with track number 00 allocated to the outermost track and track number 76 to the innermost track. And, each track is comprised of a preamble section, a plurality of sector sections and a postamble section. Sector sections in one track are of the same length and each sector section includes an ID field, containing address information, and a data field, each of which is followed by an individual gap.

As a result, when the erase heads are located as spaced apart from the read/write head to avoid cross coupling in a floppy disc device, criticalness in timing of actuating the erase heads arises. Because, while the gap-to-gap distance remains unchanged, the recording tracks are shorter for inner ones, so are the gaps between the fields. Therefore, the relativity between the gap-to-gap distance of the head assembly and the field gap of the recording track changes from track to track, so that there is a likelihood of over-erasing and/or under-erasing if the timing of actuating the erase heads is not appropriate. In severe cases, the information contained in the ID section could be erased, thereby losing a part of address information.

SUMMARY OF THE INVENTION

The disadvantages of the prior art are overcome with the present invention and an improved floppy disc device is provided.

In accordance with one aspect of the present invention, there is provided a floppy disc device comprising read/write head means provided with a read/write gap; erase head means provided with at least one erase gap, said erase head means being spaced apart from said read/write head means thereby defining a finite gap-to-gap distance between said read/write and erase gaps in the direction of movement of a recording medium with respect to said gaps; and delay circuit means for delaying energization of said erase head means over a first predetermined period of time after energization of said read/write head means and delaying deenergization of said erase head means over a second predetermined period of time after deenergization of said read/write head means. The first and second predetermined time periods may be the same, but it is preferable that the second predetermined time period is longer than the first since the gap area following the data field is usually longer than the gap area between the ID and the data fields. Preferably, use may be made of monostable multivibrators in setting the first and second predetermined periods of time.

In accordance with another aspect of the present invention, there is provided a floppy disc device for recording and reproducing information on a floppy disc comprising read/write head means provided with a read/write gap; erase head means provided with at least one erase gap, said erase head means being spaced apart from said read/write head means thereby defining a finite gap-to-gap distance between said read/write and erase gaps in the direction of movement of said floppy disc with respect to said gaps; and delay circuit means for delaying energization of said erase head means over a predetermined period of time for all of the recording tracks located inside of a predetermined recording track on the surface of said floppy disc in response to a delay control signal supplied thereto. Preferably, the delay control signal is a write current control signal which is supplied from the host side to reduce the write current. Moreover, use may be made of a counter which counts the number of concentric recording tracks on the surface of a floppy disc from the outermost or innermost track to determine the location of the predetermined recording track.

It is, therefore, an object of the present invention to provide an improved floppy disc device which is prevented from causing over-erasing and under-erasing.

Another object of the present invention is to provide a floppy disc device which can avoid cross coupling between read/write and erase heads.

A further object of the present invention is to provide a floppy disc device which is simple in structure, easy to manufacture and yet which provides ideal tunnel erase characteristics.

Other objects, advantages and novel features of the present invention will become apparent from the following detailed description of the invention when considered in conjunction with the accompanying drawings.

DESCRIPTION OF THE PREFERRED EMBODIMENTS

Figure 2:
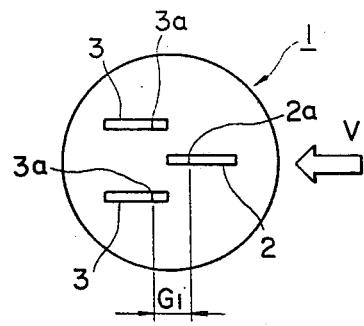
FIG. 2 is a schematic illustration showing arrangement of a read/write head and a pair of erase heads which are spaced apart from the read/write head in the downstream direction with respect to the movement of a floppy disc recording medium.

Referring now to FIG. 2, there is shown a magnetic head assembly 1 to be employed in the present floppy disc device. As shown, the assembly includes a read/write head 2 provided with a read/write gap 2a and a pair of erase heads 3, 3, each provided with an erase gap 3a. It is to be noted that the erase heads 3 are located in the downstream of the read/write head 2a with respect to the moving direction of that part of a floppy disc opposite to the assembly 1 as indicated by the arrow V. Thus, a gap-to-gap distance G1 is defined between the read/write gap 2a and the erase gaps 3a. Such a gap-to-gap distance G1 is advantageously selected so that no cross coupling occurs between the read/write 2 and erase 3 heads when both of these heads are energized at the same time.

Figure 3:
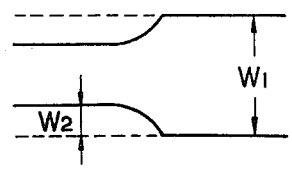
FIG. 3 is a schematic illustration showing the effects of tunnel erasing.

It should further be noted that the pair of erase heads 3, 3 is disposed on both sides of the read/write head 2. Provision of such a pair of erase heads 3, 3 is to carry out tunnel erasing to erase the edges or unwanted areas of the track immediately after it is written by the read/write head 2. The effects of tunnel erasing are best shown in FIG. 3. As shown, W1 indicates the width of the track written by the read/write head 2; whereas, W2 indicates the width of that portion of the track erased by one of the erase heads 3, 3. Therefore, as a result of tunnel erasing, the width of the track is reduced to W1-2W2, thus improving recording density.

Figure 1:
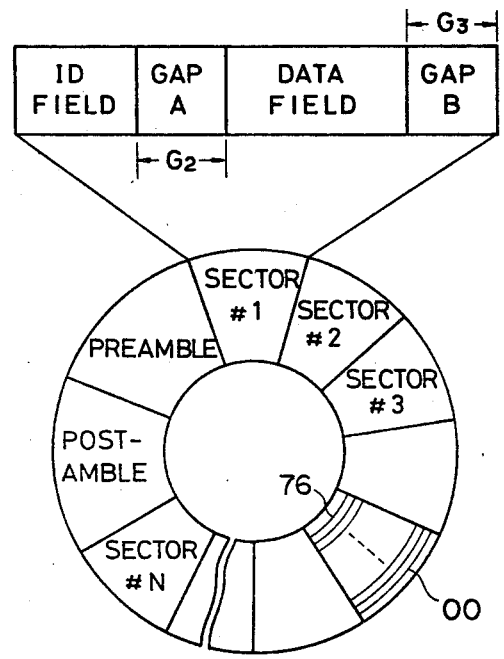
FIG. 1 is a schematic illustration showing a typical recording format of a floppy disc to be used in the present floppy disc device as a means for recording information.

As shown in FIG. 1, a floppy disc includes N concentric recording tracks—number N is usually 77 with the outermost track designated as 00, increasing the number toward inner tracks, as shown in a sector of FIG. 1. For the sake of brevity, such tracks are only partly shown in one sector in FIG. 1. As apparent from FIG. 1, each track includes a preamble section, a plurality of sector sections and a postamble section. And, each sector includes an ID field at its head, a gap A, a data field and a gap B. Importantly, the tracks in each sector have differing sizes due to the nature of the shape of a sector. In other words, as the track number increases or as moving toward inner tracks, the track length and, therefore, the gaps A and B become smaller. Thus, the relative size relationship between the gap-to-gap distance G1 and the field gap G2 or G3 is different from track to track.

Figure 4:
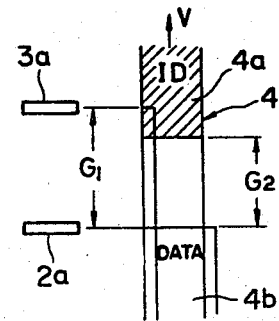
FIG. 4 is a schematic illustration showing the case where the gap-to-gap distance G1 is larger than the field gap G2 of the recording track of a floppy disc recording medium.

As described above, even if the gap-to-gap distance G1 is smaller than the field gap G2 for the outermost track, it may happen that the gap-to-gap distance G1 becomes larger than the field gap G2, as shown in FIG. 4. Under the circumstances, if both of the heads 2 and 3 are energized at the same time, a portion of the ID field 4a will be erased, thereby destroying address information contained therein. Thus, it is necessary to delay energization of the erase heads 3 by a first predetermined period of time in order to avoid such over-erasing. Similarly, at the end of the recording operation to write information into a data field, that portion of the track over the gap-to-gap distance G1 will not be properly trimmed if both of the read/write 2 and erase 3 heads are deenergized at the same time. In order to avoid such under-erase, the erase heads 3 must be delayed in deenergization as compared with the deenergization of the read/write head 2.

Figure 5:
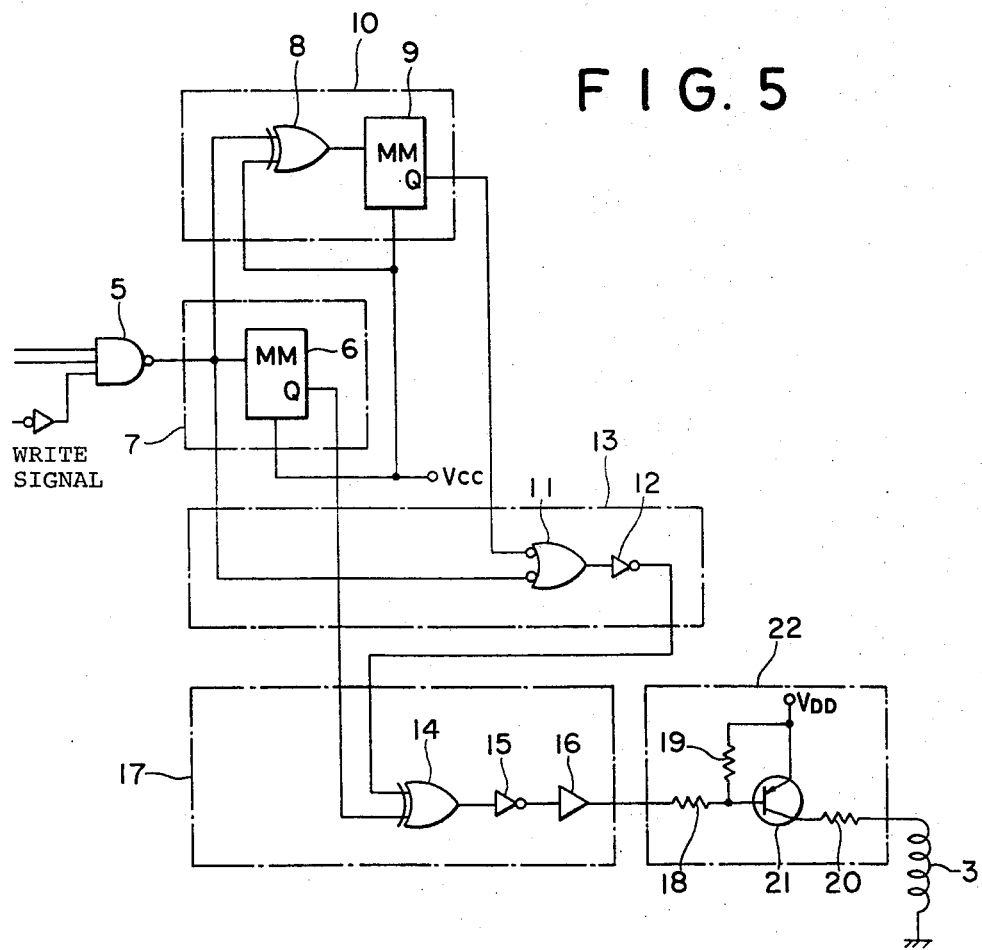
FIG. 5 is a circuit diagram showing one embodiment of the present invention.

FIG. 5 shows one embodiment of the present invention, which can delay energization and deenergization of the erase heads 3 as required. As shown, a write signal is supplied to a NAND gate 5 which is connected to a monostable multivibrator 6, which is set when the output of the NAND gate 5 goes low. The multivibrator 6 constitutes a first delay circuit 7. The output of the NAND gate 5 is also connected to one input of an exclusive OR gate 8, the output of which is connected to another monostable multivibrator 9. The other input of the gate 8 is connected to a voltage supply $V_{CC}$. Thus, when the output from the NAND gate 5 goes high, the multivibrator 9 is set. The gate 8 and the multivibrator 9 together form a second delay circuit 10. The terminal Q of the multivibrator 9 is connected to one input of an NOR gate 11 with its the other input connected from the output of the NAND gate 5, and the output of the NOR gate 11 is connected to the input of an inverter 12 which has its output connected to one input of another exclusive OR circuit 14. A combination of the NOR gate 11 and the inverter 12 constitutes an OR circuit 13. The other input of the exclusive OR gate 14 is connected from the terminal Q of the multivibrator 6. Then, the output of the exclusive OR gate 14 is connected to an inverter 15, the output of which is connected to the base of a transistor 21 through an amplifier 16 and the resistor 18. The exclusive OR gate 14, the inverter 15 and the amplifier 16 together form a coincidence circuit 17. The emitter of the transistor 21 is connected to a supply voltage $V_{DD}$ and the emitter is connected to the base through a resistor 19. The collector of the transistor 21 is connected to the erase heads 3 through a resistor 20. Thus, the transistor 21 and the associated resistors 18, 19 and 20 form a drive circuit 22 for erase heads 3.

Preferably, the actuation time of the multivibrator 6 is shorter than that of the multivibrator 9. The reason for this is that the field gap G2 is usually shorter than the field gap G3. It should be noted that although they are not shown in the drawings, a write signal is supplied to the read/write head 2 through a modulation circuit and an amplifier which is connected to a write voltage.

Figure 6:
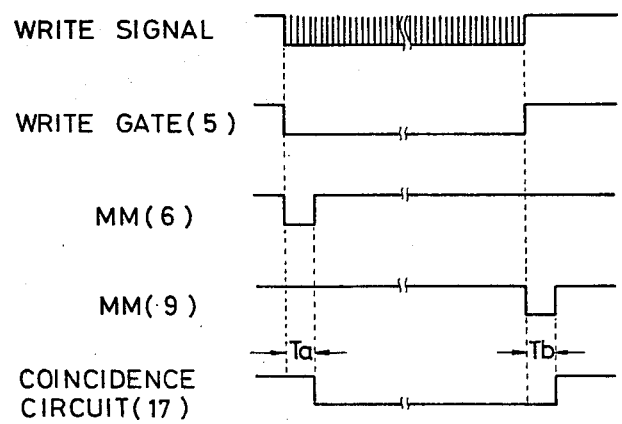
FIG. 6 is a timing chart showing several waveforms which are particularly useful in understanding the operation of the circuit shown in FIG. 5.

Now, explanation will be had with respect to the operation of the circuit shown in FIG. 5 with reference to the timing chart shown in FIG. 6. When a write signal is supplied to the NAND gate 5, the output of the NAND gate 5 goes low. At the same time, the monostable multivibrator 6 is set. It should be noted that the other monostable multivibrator 9 remains reset at this juncture. Thus, when the multivibrator 6 is reset, the output of the coincidence circuit 17 goes low and, therefore, the transistor 21 is turned on to energize the erase heads 3. Accordingly, the read/write head 2 is energized as soon as the write signal is supplied; on the other hand, energization of the erase heads 3 is delayed over a predetermined period of time determined by the actuation time of the monostable multivibrator 6.

Thereafter, when the write signal ceases to be supplied, the read/write head 2 is deenergized and, therefore, the output of the NAND gate 5 goes high, thereby the monostable multivibrator 9 is set. Then, when the monostable multivibrator 9 is reset, the output of the coincidence circuit 17 goes high to turn the transistor 21 off. As is obvious from the above description, the read/write head 2 is deenergized upon completion of the supply of the write signal, but the erase heads 3 remain energized for a while and they become deenergized after elapsing a predetermined period of time determined by the multivibrator 9. In this manner, in accordance with the present invention, energization and de-energization of the erase heads 3 are delayed over predetermined periods of time, respectively, so that over-erasing and under-erasing may be effectively avoided. The above-described embodiment of the present invention is particularly advantageous since circuit is very simple in structure, requiring only the provision of two monostable multivibrators 6 and 9.

Figure 7:
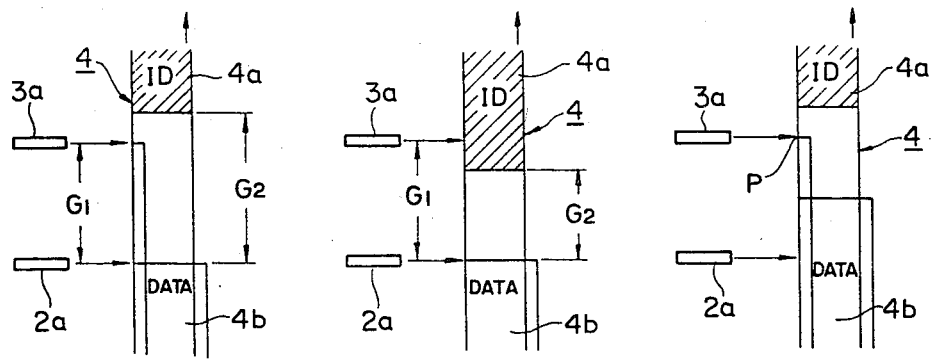
FIGS. 7(A) through (C) are schematic illustrations showing several cases where the gap-to-gap distance G1 differs from the field gap G2.

Another embodiment of the present invention will be described with reference to FIGS. 7 through 9. In accordance with this embodiment, the gap-to-gap distance G1 is selected such that it is smaller than the field gap G2 of outer recording tracks but is larger than the field gap G2 of the inner remaining recording tracks. Therefore, both of the read/write 2 and erase 3 heads may be energized at the same time for the outer recording tracks and it is only necessary to delay the energization of the erase heads 3 for the inner remaining recording tracks over a predetermined period of time.

Figure 8:
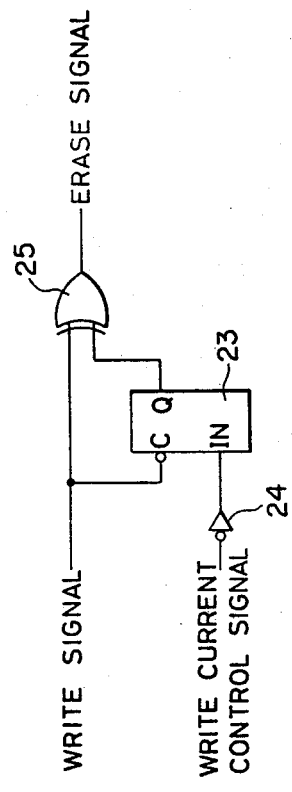
FIG. 8 is a circuit diagram showing another embodiment of the present invention.
Figure 9:
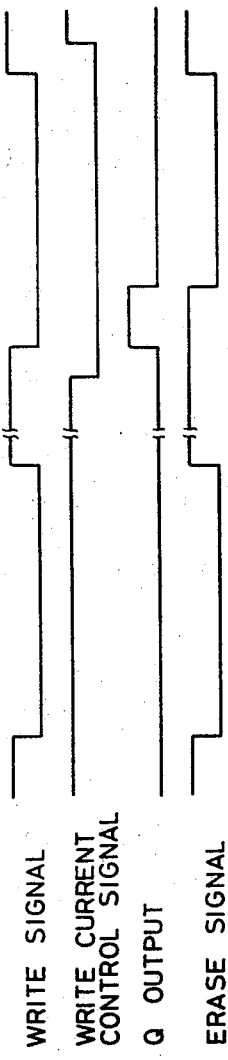
FIG. 9 is a timing chart showing several waveforms which are particularly useful in understanding the operation of the circuit shown in FIG. 8.

Referring to FIG. 8, a write current control signal from the host side is supplied to an enable terminal IN of a delay circuit 23 through an inverter 24. Such a write current control signal is produced only when data is to be written in the track which has a track number greater than a predetermined value. The delay circuit 23 has a clock terminal C to which is supplied an inverted write signal. The output terminal Q of the delay circuit 23 is connected to one input of an exclusive OR gate 25, which has the other input for receiving the write signal. The output of the exclusive OR gate 25 supplies an erase signal to be applied to the erase heads 3.

As shown in FIG. 7(A), when data is to be written into a track having a smaller track number than a predetermined value or located outside of a predetermined track, the write current control signal is not supplied to the delay circuit 23. Thus, even if the write signal is supplied to the delay circuit, the output terminal Q remains low so that the write signal passes through the exclusive OR gate 25 to form an erase signal. This behavior is clearly shown in the left half of FIG. 9. In this instance, the read/write head 2 and the erase heads 3 are energized at the same time, but no problem arises since the gap-to-gap distance G1 is smaller than the field gap G2.

FIG. 7(B) shows the case where data is to be written in the track which has a larger track number than a predetermined value or which is located inside of a predetermined track. In this instance, the gap-to-gap distance G1 is larger than the field gap G2 as best shown in FIG. 7(B) and, therefore, both of the read/write and erase heads cannot be energized at the same time since a part of the ID field 4a will be erased. In this case, the write current control signal is supplied to the delay circuit 23, as shown in the right half of FIG. 9. Thus, when the write signal is also supplied to the delay circuit 23, the output from the terminal Q goes high to inhibit the passage of the write signal through the exclusive OR gate 25 over a predetermined period of time. During this period, the track advances in the direction indicated by the arrow with respect to the read/write 2 and erase 3 heads, and when the point P in the gap area becomes aligned with the erase gaps 3a after elapsing the predetermined period of time, the output from the terminal Q goes low thereby allowing the passage of the write signal through the exclusive OR gate 25. In this manner, over-erasing can be effectively avoided. It should be noted that the time duration for inhibiting the passage of the write signal through the gate 25 or the position of the point P in the gap area must be determined in view of the innermost track as the worst case. Incidentally, the write current control signal is usually supplied for those tracks having the track number 40 or more.

As an alternative embodiment, a track address counter may be provided instead of using the write current control signal. Such a counter supplies a control signal to the input IN of the delay circuit 23 only when data is to be recorded on or reproduced from the track having a track number which is larger than a predetermined value. Moreover, it is also possible to provide a plurality of delay circuits 23, each having a different delay time and each being associated with the corresponding block of tracks.

As described above, in accordance with the second embodiment of the present invention, the delay time may be determined in consideration of some of the tracks and not all of them. Accordingly, there is a higher degree of freedom in setting the delay time, which, in turn, allows to make a delay circuit simple in structure and thus inexpensive to manufacture.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A floppy disc device for writing information into and reading information from a floppy disc having a recording format such that a plurality of recording tracks are defined concentrically and each of the concentric tracks includes at least one sector section, which, in turn, includes an ID field for storing address information, a first gap following said ID field, a DATA field following said first gap and a second gap following said DATA field, said device comprising:

read/write head means including a read/write gap for writing information into and reading information from said floppy disc;

erase head means including at least one erase gap, said erase head means being spaced apart from said read/write head means thereby defining a finite gap-to-gap distance between said read/write and erase gaps in the direction of movement of said floppy disc with respect to said gaps, said gap-to-gap distance being shorter than said first gap in each of those concentric tracks located on or outside of a reference track and said gap-to-gap distance being longer than said first gap in each of those concentric tracks located inside of said reference track;

means for determining when the read/write head and erase head means are located at a concentric track inside of said reference track and for supplying a delay control signal in response thereto; and delay circuit means for delaying energization of said erase head means over a predetermined time period after energization of said read/write head means in response to said delay control signal sufficient to allow said erase gap to be located at a point in said first gap when energized for those concentric tracks located inside of said reference track, said delay control signal being not supplied for those concentric tracks located on or outside of said reference track thereby allowing said read/write head and erase head means to be energized simultaneously therefor.

2. The floppy disc device of claim 1 wherein said delay control signal is a write current control signal supplied from a host side which is associated with said device.

3. The floppy disc device of claim 1 wherein said erase head means includes a pair of erase gaps provided on both sides of said read/write gap for erasing the edges of the track after it has been written so as to carry out tunnel-erasing.

4. The floppy disc device of claim 1 further comprising a track address counter for controlling supply of said delay control signal.

* * * * *